Oct. 2, 1956  J. OLIVEIRA  2,765,010
TENON-FORMING BOARD CARRIAGE FOR SAWS
Filed March 18, 1955  3 Sheets-Sheet 1
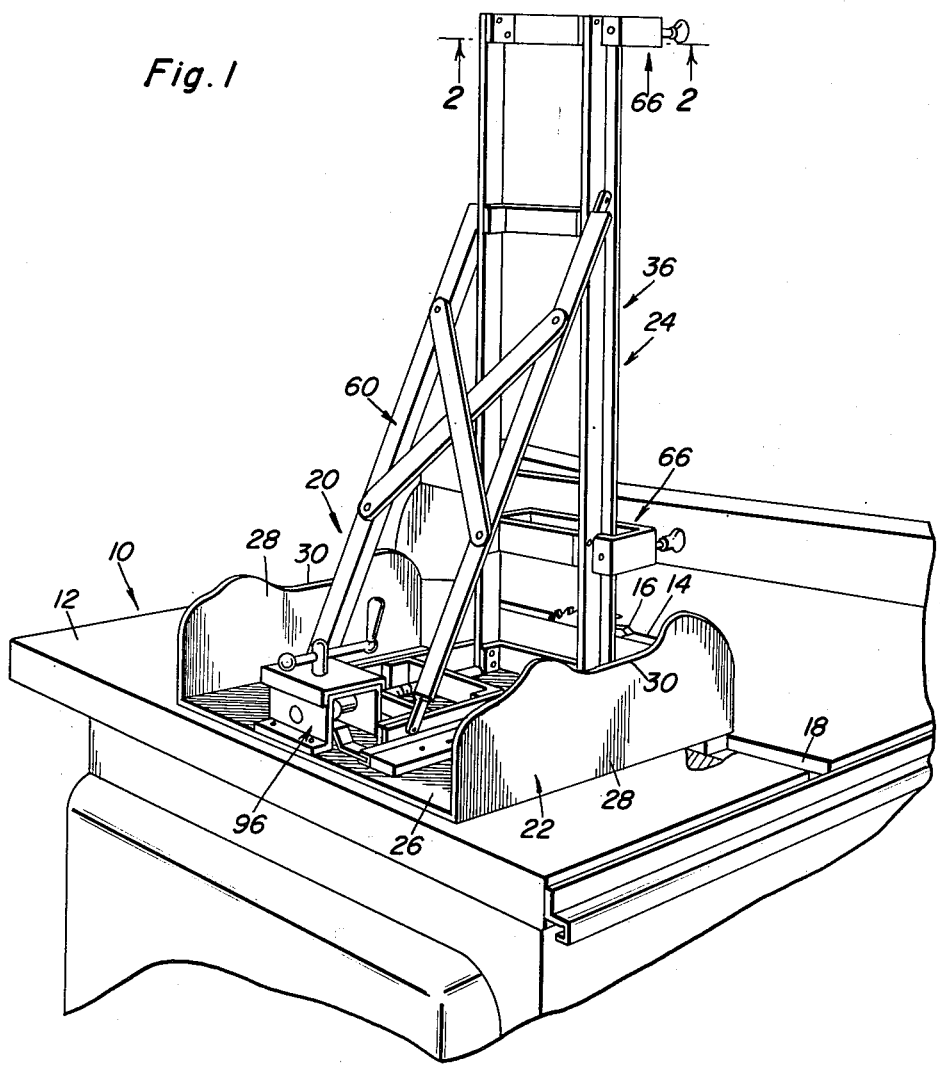
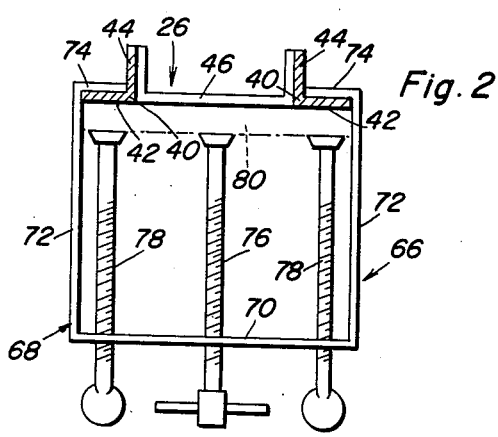
Jesse Oliveira
INVENTOR.
BY *Clarence A. O'Brien
and Harvey B. Jacobson*
Attorneys Oct. 2, 1956 J. OLIVEIRA 2,765,010
TENON-FORMING BOARD CARRIAGE FOR SAWS
Filed March 18, 1955 3 Sheets-Sheet 2
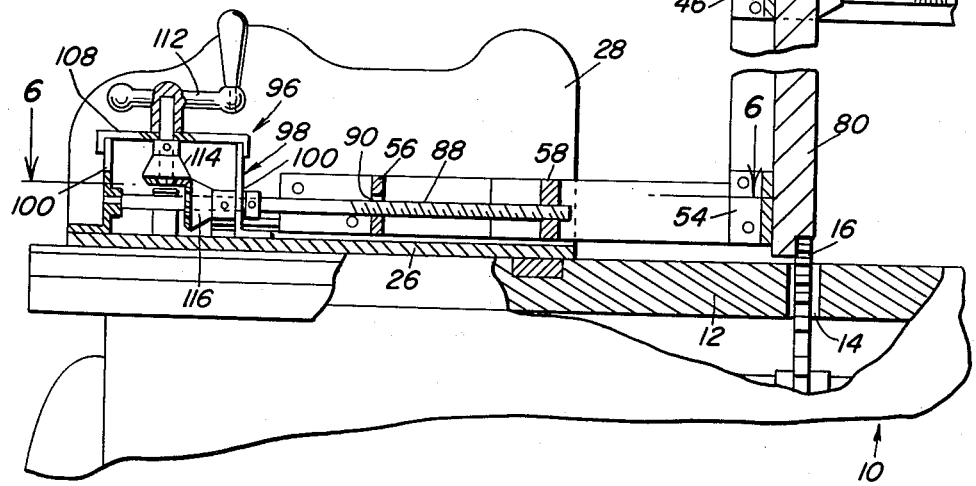
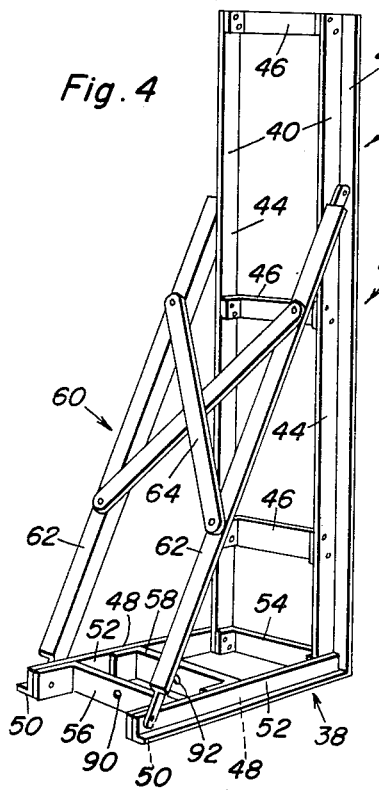
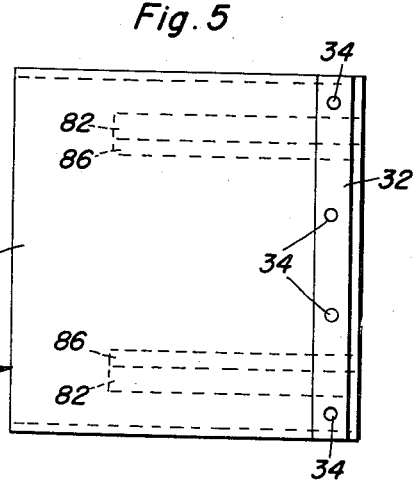
Jesse Oliveira
INVENTOR.

Oct. 2, 1956  J. OLIVEIRA  2,765,010
TENON-FORMING BOARD CARRIAGE FOR SAWS
Filed March 18, 1955  3 Sheets-Sheet 3

Jesse Oliveira
INVENTOR.

BY *Clarence A. O'Brien*
*and Harvey B. Jacobson*
Attorneys

United States Patent Office 2,765,010
Patented Oct. 2, 1956

2,765,010

TENON-FORMING BOARD CARRIAGE FOR SAWS

Jesse Oliveira, Fall River, Mass.

Application March 18, 1955, Serial No. 495,194

1 Claim. (Cl. 144—198)

This invention relates in general to new and useful improvements in attachments for saws, and more particularly to an improved board carriage for saws.

The primary object of this invention is to provide an improved attachment for table saws which may conveniently rest upon the table of such saws and be engaged in the guide channel formed in the saw for normally receiving a mitre gauge, the board carriage being of such a nature whereby it will hold a board in an upright position so that the board may be moved with respect to a saw blade of a saw to form tenons therein.

Another object of this invention is to provide an improved board carriage for saws, the board carriage being mountable on a saw table and guided through the use of the mitre gauge recess formed in the saw table, the board carriage including a base having a board support carried thereby for adjusted positioning, the board carriage being provided with suitable clamp means for retaining a board in an upright position whereby a board may be sequentially cut by a saw blade to form tenons of various widths.

Still another object of this invention is to provide an improved board carriage for saws, the board carriage including a board support having an upright frame, the upright frame being provided with a plurality of channel-shaped members intended to have received therein a board to be formed with tenons, the channel-shaped members carrying clamp members for clamping a board against the upright frame whereby a board may be held in a desired vertical position for forming tenons in the end thereof.

A further object of this invention is to provide an improved board carriage for adapting a table saw into a tenon cutter, the board carriage including a plate having a board support adjustably carried thereby, there being provided suitable means for guiding and adjustably positioning the board support with respect to the base.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the board carriage which is the subject of this invention and shows the same mounted on a table of a conventional type of table saw, only a portion of the table saw being illustrated;

Figure 2 is an enlarged horizontal sectional view taken substantially upon the plane indicated by the section line 2—2 of Figure 1 and shows the details of the means for clamping a board in a position for having tenons formed therein by the saw;

Figure 6:
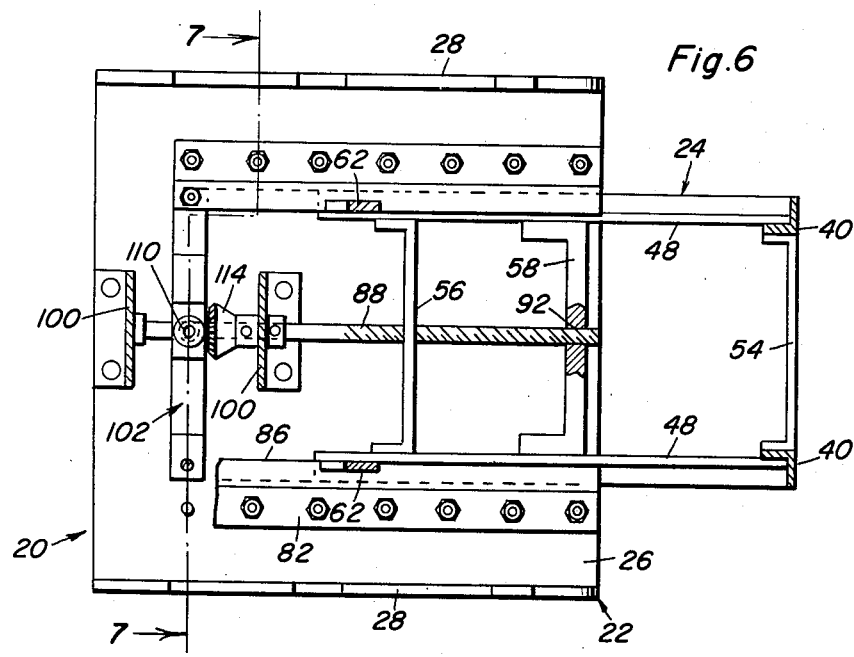
Figure 7:
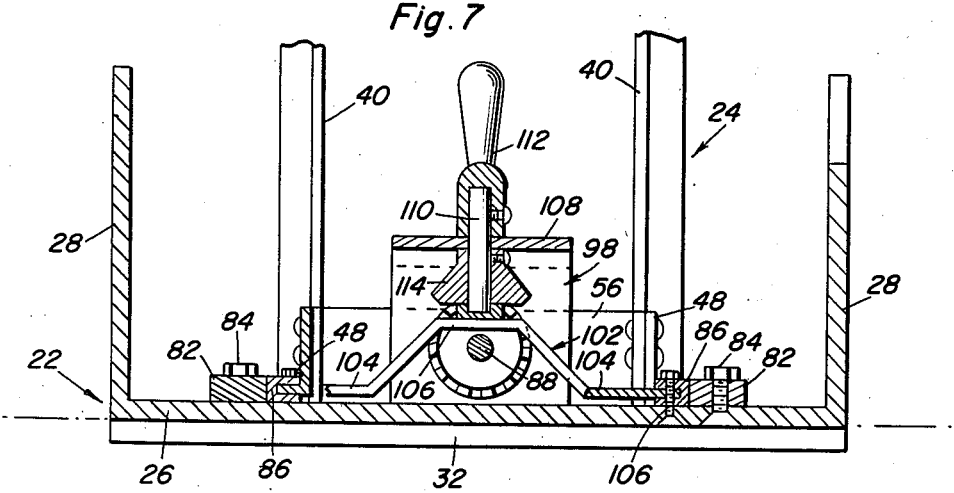

Figure 3 is an enlarged transverse sectional view through the central part of the lower portion of the board carriage and shows the details of the means for adjustably positioning the board support with respect to the base, a portion of the saw table being broken away and shown in section and a board being carried by the board carriage in alignment with a saw blade of a saw for having a tenon formed therein;

Figure 4 is a perspective view of the board support per se and shows the details thereof;

Figure 5 is a bottom plan view of the base with the board support omitted and shows the position of the guide with respect thereto;

Figure 6 is an enlarged horizontal sectional view taken substantially upon the plane indicated by the section line 6—6 of Figure 3 and shows the manner in which the board support is both mounted for guided movement with respect to the base and means for adjustably positioning the same; and Figure 7 is an enlarged longitudinal sectional view taken substantially upon the plane indicated by the section line 7—7 of Figure 6 and shows the manner in which the horizontal frame of the board support is mounted for guided movement with respect to the base, also being illustrated is the mounting of the gear mechanism for the feed screw.

Referring now to the drawings in detail, it will be seen that there is illustrated in Figures 1 and 3 a conventional type of table saw which is referred to in general by the reference numeral 10. The table saw 10 includes a relatively large horizontal table 12 having a saw recess 14 formed therein. Projecting upwardly through the saw recess 14 is a saw blade 16. Formed in the upper surface of the table 12 in spaced parallel relation with respect to the saw 16 is a mitre gauge receiving recess 18. It is to be understood that the table saw 10 includes many other important features which are conventional and not described inasmuch as they are not pertinent to the present invention.

Seated on the table 12 and guided with respect to the saw blade 16 is the board carriage which is the subject of this invention, the board carriage being referred to in general by the reference numeral 20. The board carriage 20 includes a base, which is referred to in general by the reference numeral 22. Carried by the base 22 for adjustable positioning with respect thereto is a board support which is referred to in general by the reference numeral 24.

The base 22 includes a rectangular bottom or base portion 26 which has extending upwardly at the opposite ends thereof upstanding end members 28. The end members 28 extend transversely of the base 22 and have the upper portions thereof configurated, as at 30, to form hand grips.

Secured to the underside of the base portion 26 adjacent an inner side edge thereof is a guide strip 32 (Figs. 5 and 7). The guide strip 32 extends longitudinally of the base 22 and is secured thereto by suitable fasteners 34. It is to be understood that the guide strip 32 depends from the base 22 and is of a size to be guidingly received in the recess 18, as is best illustrated in Figure 3. By gripping one of the hand grips, the base 22 may be reciprocated along the saw table 12 in parallel relation with respect to the saw blade 16.

Referring now to Figure 4 in particular, it will be seen that the board support 24 includes a vertical frame, which is referred to in general by the reference numeral 36, and a horizontal frame, which is referred to in general by the reference numeral 38. The vertical frame includes a pair of spaced parallel frame rails 40. The frame rails 40 are preferably formed of angle members which include first flanges 42 disposed in a common plane and being disposed innermost. Each frame rail 40 also includes a rearwardly disposed flange 44. The frame rails 40 are connected together by a plurality of vertically spaced channel members 46. The channel members 46 are horizontally disposed and have flanges thereof connected to opposed faces of the flanges 44.

The horizontal frame 38 includes a pair of spaced parallel frame rails 48. The frame rails 48 are formed of angle members and include oppositely directed horizontal flanges 50. The frame rails 48 also include vertically disposed flanges 52.

The frame rails 48 project into the lower parts of the frame rails 40 and are internested therewith. Extending between the lower ends of the frame rails 40 and connected to the flanges 44 of the frame rails 40 and the flanges 52 of the frame rails 48 is a channel-shaped frame member 54. The outer ends of the frame rails 48 are connected together by a channel-shaped frame member 56 which is connected to the flanges 52. Disposed intermediate the ends of the frame rails 48 and secured to the flanges 52 thereof is a channel-shaped block 58.

The frame 36 and the frame 38 are braced with respect to each other by a brace assembly which is referred to in general by the reference numeral 60. The brace assembly 60 includes a pair of brace members 62 which extend between the frame rails 40 and 48 and are secured to the flanges 44 and 52, respectively, thereof. The brace members 62 are connected together by a suitable X-bracing 64.

In order that boards may be secured to the board support 24 in vertical positions, there is provided on the vertical frame 36 a pair of vertically spaced clamp assemblies which are referred to in general by the reference numeral 66. The clamp assemblies 66 are substantially identical and are best illustrated in Figure 2. Each clamp assembly 66 includes a channel-shaped member 68 including a web 70, a pair of spaced parallel flanges 72, and inturned opposed end flanges 74. The end flanges 74 are engaged behind the flanges 42 of the frame rails 40. Threadedly passing through the web 70 is a central clamp screw 76. Also threadedly passing through the web 70 are outer clamp screws 78. The clamp screws 76 and 78 combine to clamp a board, such as a board 80, against the vertical frame 36.

As is best illustrated in Figure 2, the pressure exerted upon a board 80 by the clamp screws 76 and 78 will pull the end flanges 74 against the flanges 42. Thus, the clamp assembly 66 will be retained in place by the pressure exerted thereby on a board 80. If desired, the channel-shaped members 68 may be slidably mounted on the frame rails 40 for selected vertical positioning. On the other hand, if desired, they may be rigidly secured to the frame rails 40 by suitable fasteners.

Referring now to Figures 6 and 7 in particular, it will be seen that there is secured to the base portion 26 of the base 22 a pair of spaced parallel bars 82. The bars 82 are secured to the base portion 26 by suitable fasteners 84. Secured to each of the bars 82 is a guide channel 86, the guide channels being in opposed relation. The board support 24 is mounted on the base 22 by positioning the flanges 50 of the frame rails 48 in the guide channels 86. Thus, the board support 24 is mounted for guided movement transversely of the base 22.

In order that the board support 24 may be adjustably positioned transversely of the base 22, there is provided a feed screw 88. The feed screw 88 freely passes through a board 90 (Fig. 3) in the frame member 56 and is threadedly engaged in a bore 92 (Fig. 6) in the bar 58.

Disposed at the outer end of the feed screw 88 is a gear box assembly which is referred to in general by the reference numeral 96, as is best illustrated in Figure 1. The gear box assembly 96 includes a first inverted channel 98 (Fig. 7) which is secured to the base 22 and is disposed transversely thereof. The channel 98 includes transversely spaced vertical flanges 100 (Fig. 3) in which the outer end portion of the feed screw 88 is journaled.

The gear box assembly 96 also includes a longitudinal second channel 102 which is best illustrated in Figure 7. The channel 102 is inverted and includes lower wing flanges 104 having ends thereof disposed in the guide channels 86 and secured therein by suitable fasteners 106. The second channel 102 is of a lesser height than the channel 98 and includes an upper web 106 which is disposed above the feed screw 88, but spaced considerably below an upper web 108 of the channel 98. Suitably journaled in the webs 106 and 108 and passing upwardly above the web 108 is an operating shaft 110. The operating shaft 110 is provided with a control handle 112.

Mounted on the operating shaft 110 between the webs 106 and 108 is a first gear 114. The gear 114 is meshed with a gear 116 carried by the feed screw 88. Thus, when the handle 112 is rotated, the feed screw 88 will be rotated likewise.

In the operation of the present invention, a board 80 is clamped in the vertical position by means of the clamp assembly 66. The board is so clamped whereby it slightly clears the upper surface of the table 12. The saw blade 16 is then run up through the table 12, the height required to provide a tenon of the desired depth. Then the board support 24 is adjusted with respect to the base 22 so that the desired part of the edge of the board 80 is aligned with the saw blade 16. Then, the entire board carriage 20 is slid along the saw table 12 to provide the necessary cut in the end of the board 80. Should the cut be too narrow, it is merely necessary to adjust the board support 24 for a second or third cut, as necessary. Thus, any type of tenon may be formed.

While it has not been specifically illustrated, on tables wherein the saw blade may be tilted with respect to the saw table, dove-tails may be formed in the same manner described above.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

In a saw attachment of the type including a base and a frame slidably mounted on said base, a feed screw assembly for said frame, said feed screw assembly comprising a pair of internested inverted channel supports disposed at right angles to each other and mounted on said base, a feed screw having one end journaled in the outer one of said channel supports, an opposite end of said feed screw being threadedly connected to said frame, an operating shaft disposed normal to said feed screw and journaled in both said channel supports, meshed gears between said channel supports, one gear on said operating shaft and one on said one end of said feed screw.

References Cited in the file of this patent

UNITED STATES PATENTS

| | | |
|---|---|---|
| 415,717 | Hoyt | Nov. 26, 1889 |
| 517,336 | Farchmin | Mar. 27, 1894 |
| 690,106 | Hansel | Dec. 31, 1901 |
| 1,651,846 | Stauder | Dec. 6, 1927 |
| 2,085,236 | Tautz | June 29, 1937 |
| 2,242,792 | Panzer | May 20, 1941 |
| 2,371,831 | Leming | Mar. 20, 1945 |